Nov. 17, 1931.  B. Z. HAUSNER  1,832,704
PICTURE MOUNT
Filed Nov. 20, 1930
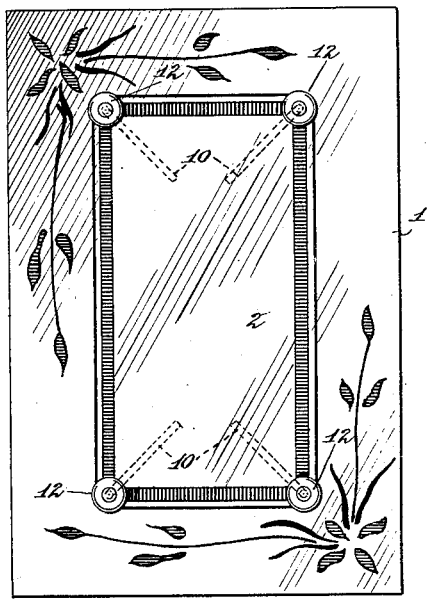
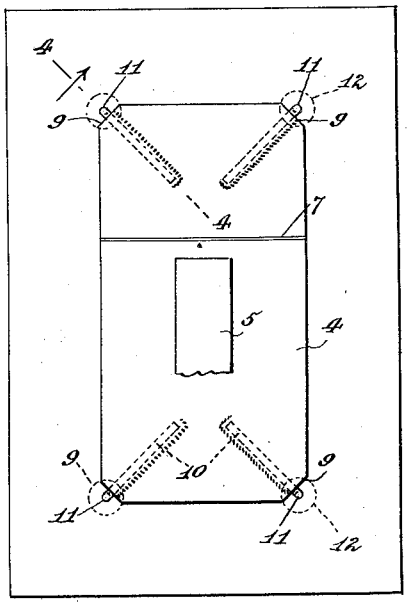
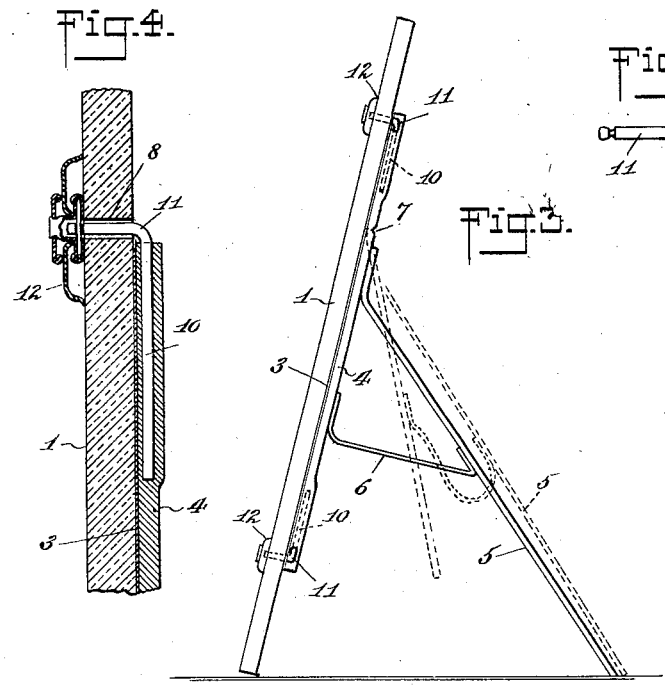
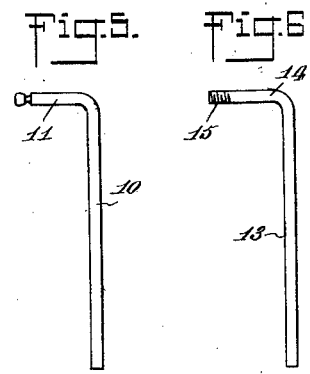
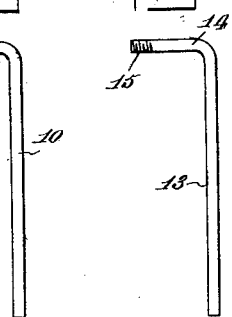
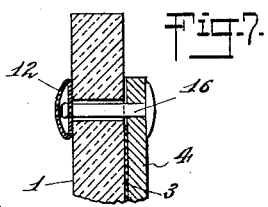
WITNESSES
INVENTOR
Ben Z. Hausner
BY
ATTORNEYS Patented Nov. 17, 1931

1,832,704

UNITED STATES PATENT OFFICE

BEN Z. HAUSNER, OF YONKERS, NEW YORK

PICTURE MOUNT

Application filed November 20, 1930. Serial No. 497,030.

This invention relates to picture mounts, and more particularly to that class of picture mounts having a front glass panel with a transparent central portion to expose a picture held back of the panel.

An object of the invention is to provide improved means for securing the backing plate to the panel, which permits of adjustment of the coupling devices so as to cause them to properly register with openings in the panel and clamp the backing plate against the panel as tightly as may be desired.

A further object is to provide coupling means of this character which permit of the employment of ornamental devices on the front of the panel, directly coupled to devices carried by the backing plate and dispense with the necessity of separate ornamental devices held by bolts, nuts and the like.

A further object is to provide coupling devices which are in the nature of snap fasteners or other quick coupling means, which enable the ready dissociation of the parts for the insertion or removal of a picture between the panel and the backing plate.

With these and other objects in view, the invention consists in certain novel features of construction and combinations and arrangements of parts, all of which will be more fully hereinafter described and pointed out in the claims.

In the accompanying drawings,—

Figure 1 is a view in front elevation of my improved picture mount;

Figure 2 is a rear view of the picture mount, the brace or easel being broken away;

Figure 3 is an edge view of the device shown in Figures 1 and 2;

Figure 4 is an enlarged view in section on the line 4—4 of Figure 2;

Figure 5 is a view in side elevation of one of my improved coupling members;

Figure 6 is a view similar to Figure 5, illustrating a modified form of the coupling member; and Figure 7 is a fragmentary view of the section illustrating another modified form of the coupling member.

My improved picture mount includes a front panel 1, which is preferably of glass or other transparent material and may be mirrored or ornamented in any way desired, and provided with a central transparent portion 2 through which the picture 3 may be exposed back of the panel, and held thereagainst by a backing plate 4.

The backing plate 4 may, of course, be made of any suitable material, but it is ordinarily made of cardboard suitably covered, and of a size and shape to fit back of the clear portion 2 of the panel 1. This backing plate 4 may have a brace or easel member 5 connected thereto with a flexible strap 6 connecting the backing plate and easel to limit the movement of the easel.

Furthermore, the backing plate is preferably formed with a scored line or depression 7, which enables the backing plate to hinge at this scored line and allows the picture to be inserted between the backing plate and front panel by merely disconnecting the lower end of the backing plate from the panel, as will be readily understood.

My invention has particularly to do with the specific manner of coupling the backing plate to the front panel, as will now be explained.

The front panel 1 is provided with openings 8, preferably four in number, and located at the corners of the transparent portions 2 of panel 1. The backing plate 4 at its corners is preferably cut off at an angle, as shown at 9, although this not essential but is preferable as it provides a surface or thickness for the ready insertion of a comparatively long prong 10 constituting an integral portion of a stud 11, said prong and stud constituting my improved coupling member.

This coupling member may be made of wire and bent at right angles, as indicated, so as to provide the stud portion 11 and prong portion 10, and this portion may, of course, be as sharp as may be desired, but where small gage wire is used it is not necessary to sharpen the prong to enable the same to be forced into the backing sheet 5 between thicknesses thereof.

This coupling member provides a relatively cheap device which can be easily secured to the backing plate, but its advantage lies particularly in the fact that it is capable of being bent or being inserted as far as may be desired to allow the stud member 11 to exactly register with the openings 8 in the panel 1, and prevent any necessity of force or pressure being applied which is apt to break the glass panel.

The stud member 11 illustrated in Figure 5 may constitute the stud member of a snap fastener, and is of a length to project through and beyond the panel 1 and receive a socket member 12 snapped thereon. This socket member 12 constitutes an ornament and may be constructed in any way desired and ornamented in any way desired, so that the coupling consists of a two-part device with the socket member constituting an ornament for the front of the panel.

As a modification of this form of coupling device, I illustrate in Figure 6 a coupling member consisting of a prong 13 and a stud member 14 made of a single length of wire bent at right angles, the stud member 14 having screw threads 15 thereon for the reception of an ornamental screw-threaded nut member, not shown.

In Figure 7 I illustrate another modification of my invention, in which an ordinary form of stud member 16 is secured to the backing plate 4, but in other respects the construction is similar to that above described.

It is of great importance in a device of this kind to have coupling means which is capable of a certain amount of adjustment for proper registration with the holes or openings in the glass panel, so as to prevent any possibility of breaking.

While I have illustrated my improved panel as supported by an easel, it is obvious that it may be supported in any other way desired, and I do not wish to be limited to the specific supporting means.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A picture mount including a front transparent panel having openings therein, a backing plate, coupling members having prongs projected into the backing plate whereby said prongs may be adjusted longitudinally in the backing plate, stud members located at right angles to the prongs and adapted to be projected through the openings in the front panel, and devices secured on the ends of the stud members at the front of the panel and coupling the back plate to the panel.

2. A picture mount including a front transparent panel having openings therein, a backing plate, coupling members having prongs projected into the backing plate whereby said prongs may be adjusted longitudinally in the backing plate, stud members located at right angles to the prongs and adapted to be projected through the openings in the front panel, and devices secured on the ends of the stud members at the front of the panel and coupling the back plate to the panel, said stud member and said devices constituting snap fasteners.

BEN Z. HAUSNER.